(12) United States Patent
Yan et al.

(10) Patent No.: US 9,020,947 B2
(45) Date of Patent: Apr. 28, 2015

(54) WEB KNOWLEDGE EXTRACTION FOR SEARCH TASK SIMPLIFICATION

(75) Inventors: Jun Yan, Beijing (CN); Lei Ji, Beijing (CN); Ning Liu, Beijing (CN); Zheng Chen, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 11 days.

(21) Appl. No.: 13/307,836

(22) Filed: Nov. 30, 2011

(65) Prior Publication Data

US 2013/0138655 A1  May 30, 2013

(51) Int. Cl.
*G06F 7/00* (2006.01)
*G06F 17/30* (2006.01)

(52) U.S. Cl.
CPC ................... *G06F 17/30702* (2013.01)

(58) Field of Classification Search
None
See application file for complete search history.

(56) References Cited

U.S. PATENT DOCUMENTS

| | | | |
|---|---|---|---|
| 6,778,995 B1* | 8/2004 | Gallivan ..................... | 707/739 |
| 2005/0192983 A1* | 9/2005 | Hattori et al. | |
| 2008/0082518 A1* | 4/2008 | Loftesness ..................... | 707/5 |
| 2009/0216708 A1* | 8/2009 | Madaan et al. ................... | 707/2 |
| 2009/0307256 A1* | 12/2009 | Tiyyagura ..................... | 707/102 |
| 2010/0223214 A1* | 9/2010 | Kirpal et al. ..................... | 706/12 |
| 2010/0257440 A1* | 10/2010 | Kshirsagar et al. ............. | 715/230 |

OTHER PUBLICATIONS

Lin et al., "Hierarchical Web-page Clustering via In-page and Cross-page Link Structures," Jun. 12, 2010, www.cs.uiuc.edu/~hanj/pdf/pakdd10_xlin.pdf.*

Moreno Carullo, "Web Content Mining with Multi-Source Machine Learning for Intelligent Web Agents", Published on: Dec. 2010, Available at: http://insubriaspace.cilea.it/bitstream/10277/278/1/Phd_thesis_carullo_completa.pdf, 83 pgs.

Dong, et al., "A Robust Approach of Automatic Web Data Record Extraction", In Journal of Computational Information Systems, vol. 5, Issue 6, Dec. 2009, pp. 1757-1766.

Hao, et al., "From One Tree to a Forest: a Unified Solution for Structured Web Data Extraction", In Proceedings of the 34th International ACM SIGIR Conference, Jul. 24-28, 2011, pp. 775-784.

Kang, et al., "Recognising Informative Web Page Blocks Using Visual Segmentation for Efficient Information Extraction", In Journal of Universal Computer Science, vol. 14, Issue 11, Jan. 2008, pp. 1893-1910.

(Continued)

*Primary Examiner* — Usmaan Saeed
*Assistant Examiner* — Yu Zhao
(74) *Attorney, Agent, or Firm* — Stephen A. Wight; Eric Chang; Micky Minhas

(57) ABSTRACT

Techniques are described for generating structured information from semi-structured web pages, and retrieving the structured knowledge in response to a user query that indicates a query intent. The structured information is automatically extracted offline from semi-structured web pages, through the use of an auto wrapper solution that is noise tolerant, scalable, and automatic. The structured information is stored in a knowledge base, and provided in response to a user search query that indicates a query intent. Extraction of structured information may also include clustering of pages based on their measured similarities. The clusters may be determined based on similar elements in the tag path text data of the pages. A minimum size threshold may be applied to the clusters.

19 Claims, 11 Drawing Sheets

(56) References Cited

OTHER PUBLICATIONS

Kao, et al., "DOMISA: DOM-based Information Space Adsorption for Web Information", In Proceedings of the SIAM International Conference on Data Mining, Jun. 13-14, 2004, pp. 312-320.

Yi, et al., "Eliminating Noisy Information in Web Pages for Data Mining", In Proceedings of the ninth ACM SIGKDD International Conference on Knowledge Discovery and Data Mining, Aug. 24-27, 2003, pp. 296-305.

* cited by examiner

702

Page 1
01: <html><body>
02: <a>
03:     Archipelago 1.14
04: </a>
05: <dl>
06:     <dt>Price:</dt>
07:         <div>$2.99</div>
08:     <dt>Last updated</dt>
09:         <div>09/26/2010</div>
10: </dl>
11: <a>
12:     Recommendations
13: </a>
14: <ul>
15:     <li>Par 72 Golf</li>
16:     <li>Mathpac 5.6</li>
17:     <li>FourNumGuess 1.0.6</li>
18: </ul>
19: </html></body>

FIG. 7A 704 706

Page 1
01: <html><body><a>                          Archipelago 1.14
02: <html><body><dl><dt>                     Price:
03: <html><body><dl><dt><div>               $2.99
04: <html><body><dl><dt>                     Last updated:
05: <html><body><dl><dt><div>               09/26/2010
06: <html><body><a>                          Recommendations
07: <html><body><ul><li>                    Par 72 Golf
08: <html><body><ul><li>                    Mathpac 5.6
09: <html><body><ul><li>                    FourNumGuess 1.0.6

FIG. 7B

Page 2
01: <html><body><a>                        Blockx 3D Pro 1.3
02: <html><body><dl><dt>                   Price:
03: <html><body><dl><dt><div>              $1.10
04: <html><body><dl><dt>                   Last updated:
05: <html><body><dl><dt><div>              11/18/2010
06: <html><body><dl><dt>                   Category:
07: <html><body><dl><dt><div>              Game
08: <html><body><a>                        Recommendations
09: <html><body><ul><li>                   Quickoffice
10: <html><body><ul><li>                   Abyss
11: <html><body><ul><li>                   OminiGSoft
12: <html><body><ul><li>                   Nintali

Root Template:
01:    Data Section
02:    <html><body><dl><dt>        Price:
03:    Data Section
04:    <html><body><dl><dt>        Last updated:
05:    Data Section
06:    <html><body><a>             Recommendations

FIG. 7D 720
722
724

| Page 1 | | |
|---|---|---|
| 01: | <html><body><a> | Archipelago 1.14 |
| 02: | <html><body><dl><dt> | Price: |
| 03: | <html><body><dl><dt><div> | $2.99 |
| 04: | <html><body><dl><dt> | Last updated: |
| 05: | <html><body><dl><dt><div> | 09/26/2010 |
| 06: | <html><body><a> | Recommendations |
| 07: | <html><body><ul><li> | Par 72 Golf |
| 08: | <html><body><ul><li> | Mathpac 5.6 |
| 09: | <html><body><ul><li> | FourNumGuess 1.0.6 |

Detail Template 1:
| | | |
|---|---|---|
| 01: | <html><body><a> | #value# |
| 02: | <html><body><dl><dt> | Price: |
| 03: | <html><body><dl><dt><div> | #value# |
| 04: | <html><body><dl><dt> | Last updated: |
| 05: | Data Section | |
| 06: | <html><body><dl><dt><div> | #optional value# |
| 07: | Data Section | |
| 08: | <html><body><a> | Recommendations |
| 09: | <html><body><ul><li> | #list# |

Detail Template 2:
| | | |
|---|---|---|
| 01: | <html><body><a> | #value# |
| 02: | <html><body><dl><dt> | Price: |
| 03: | <html><body><dl><dt><div> | #value# |
| 04: | <html><body><dl><dt> | Last updated: |
| 05: | <html><body><dl><dt><div> | #value# |
| 06: | <html><body><dl><dt> | #optional value# |
| 07: | <html><body><dl><dt><div> | #optional value# |
| 08: | <html><body><a> | Recommendations |
| 09: | <html><body><ul><li> | #list# |

FIG. 7G

WEB KNOWLEDGE EXTRACTION FOR SEARCH TASK SIMPLIFICATION

BACKGROUND

Search engines provide a valuable tool to users seeking information on the web. Traditional search engines provide a means for a user to enter a search query, and a display to provide the search results to the user. For example, a user may enter a search query into query text input box, and click a search button or other control to request execution of the search query. The search engine may then provide a list of various web sites that are the results of the search, indicated by Uniform Resource Locators (URLs) or other identifying information. Unfortunately, search result lists may be lengthy and/or noisy, making it difficult for a user to find desired information.

SUMMARY

Techniques are described for generating structured information from semi-structured web pages, and retrieving the structured information in response to a user query that indicates a query intent. The structured information is automatically extracted offline from semi-structured web pages that may be noisy and/or complex, through the use of an auto wrapper solution that is noise tolerant, and scalable to deal with large amounts of data. Extraction of the structured information includes transforming the web page data into lists of tag path text items based on the document object model (DOM) of each page, and determining tag path text occurrence vectors and tag path text position vectors from the DOM trees. These vectors are employed to determine root templates and detail templates for the web pages. Structured information is generated in tabular form based on the root and detail templates. The structured information is stored in a knowledge base or other data repository and provided in response to a user search query with a user intent. Offline extraction and storage of structured information in a knowledge base enables the information to be provided more readily in response to online user search queries.

Extraction of structured information may also include a pre-processing stage in which one or more clusters of pages are determined for the input web pages, based on measured similarities between the pages. The clusters may be determined based on similar elements in the tag path text data of the pages. A minimum size threshold may be applied to the clusters, such that clusters below a threshold number of pages are removed and not used in subsequent processing.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIGS. 7A-7H depict example collections of web site data in various stages of processing for determining structured information, according to embodiments.

DETAILED DESCRIPTION

Overview

Embodiments described herein provide for the automatic extraction of structured information from semi-structured web pages. Extraction of structured information may be performed offline by one or more server devices. In some embodiments, such server devices are dedicated to a task of web knowledge extraction to provide structured information. In other embodiments, the extraction of structured information occurs on devices that also perform other functions, such as providing a web search engine. After extraction, the structured information may be stored in a knowledge base or other data storage mechanism, and retrieved in response to user queries.

Figure 1:
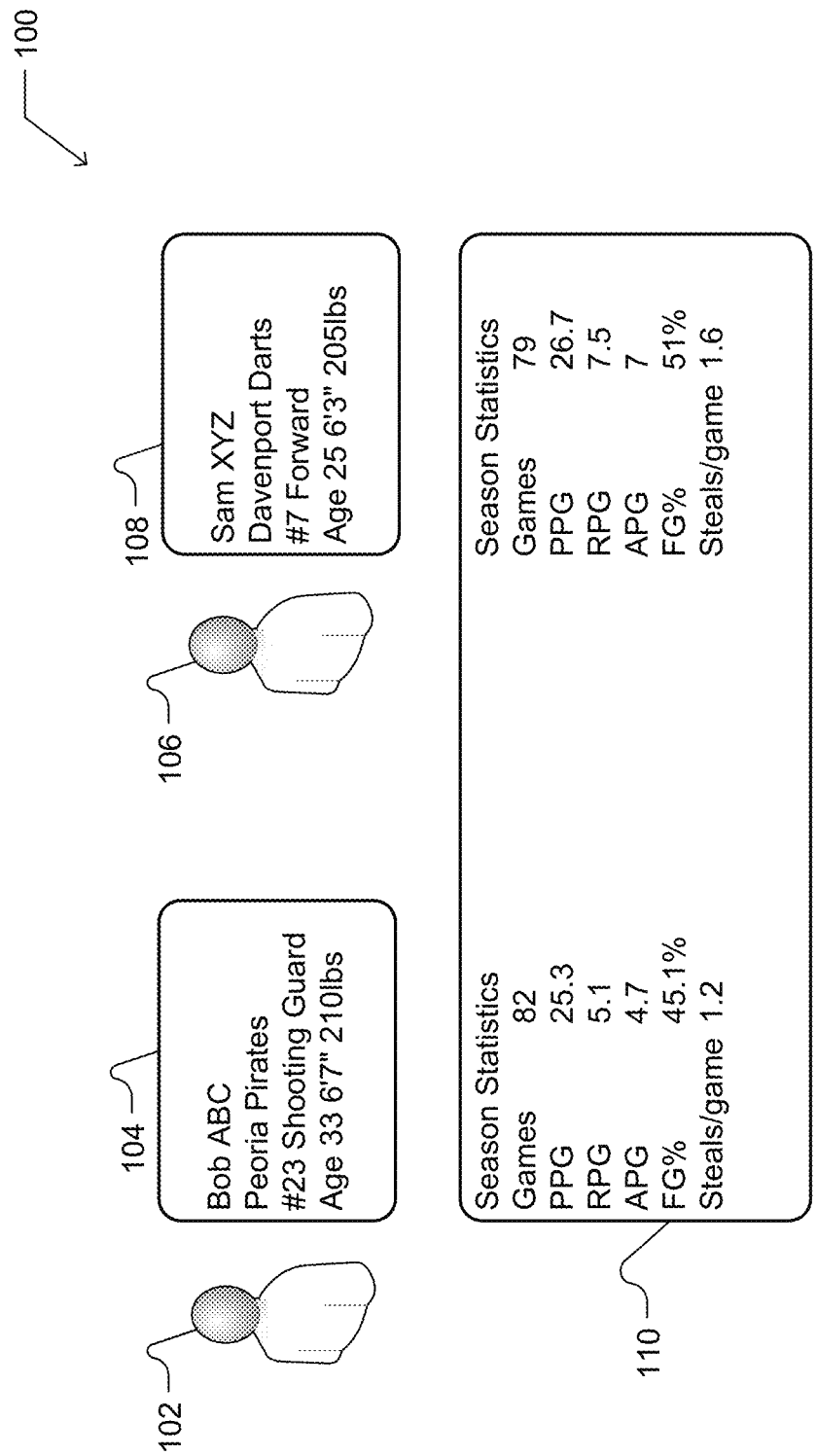
FIG. 1 depicts example structured information that may be presented to a user in response to an example comparison query.

In some embodiments, structured information includes list, tables, graphs, or other digests of information, presented in a format such that a user may more readily find useful information. An example of structured information is depicted in FIG. 1. This example shows structured information 100 that may be presented in response to a user search query searching for information to compare to professional athletes, "Bob ABC" and "Sam XYZ." In this example, the user may have entered the query "Bob ABC vs. Sam XYZ." The example structured information 100 includes an image 102 and biographical information 104 associated with Bob ABC, and an image 106 and biographical information 108 associated with Sam XYZ. The example structured information 100 further includes a tabular comparison 110 of season statistics for each of the two players. Such structured information presented in a summarized or digest format enables the user to see at a glance the desired comparison information, and may free the user from a time-consuming search through multiple web sites in a search results list.

In some embodiments, extraction of structured information includes transforming the document object model (DOM) tree of one or more web pages to form a list of tag path text items for each page. As used herein, tag path text data refers to the full path from the root of the DOM tree to a tag, coupled with the text data associated with that tag. The tag path text data items may then be employed to determine tag path text occurrence vectors and tag path text position vectors for data items in the tag path text data for the pages. The tag path text occurrence vectors are used to determine a root template that includes those data items that are present in more than a certain threshold number of the pages, and that occur once in those pages where they are present. The root template is then used to determine data blocks in the web page data, and detail templates are determined recursively through analysis of the tag path text position vectors. The structured information is extracted from the root template and detail templates, and then stored in a knowledge base.

Some embodiments include a pre-processing phase of clustering the one or more web pages based on determined similarities between at least some of the web pages. This clustering may measure similarities in the tag path text data of the pages, and determine one or more clusters of pages. In some embodiments, clusters smaller than a minimum number of pages may be removed and not employed in further processing.

Example Environment

Figure 2:
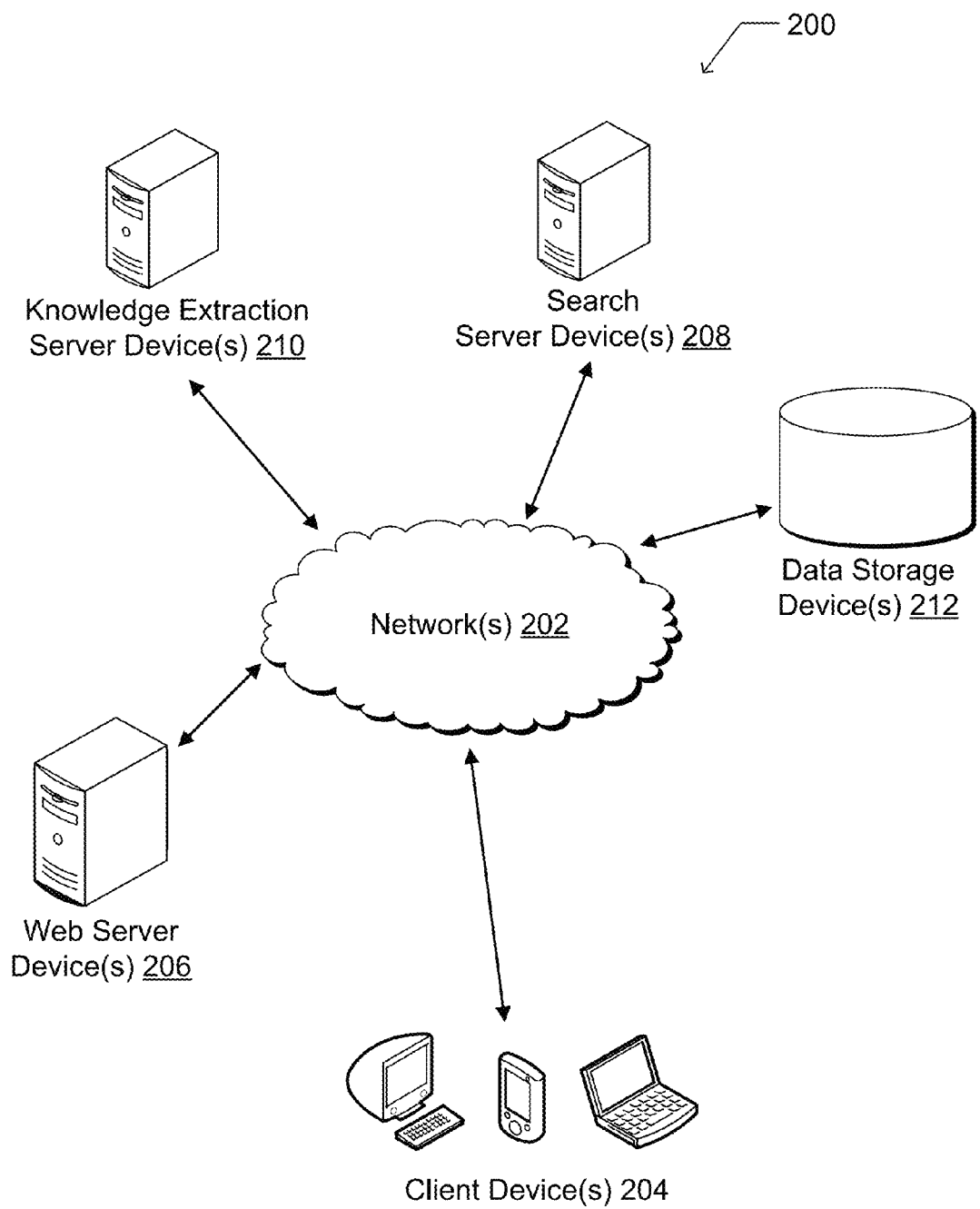
FIG. 2 is a schematic diagram depicting an example environment in which embodiments may operate.

FIG. 2 shows an example environment 200 in which embodiments operate. As shown, the various devices of environment 200 communicate with one another via one or more networks 202 that may include any type of networks that enable such communication. For example, networks 202 may include public networks such as the Internet, private networks such as an institutional and/or personal intranet, or some combination of private and public networks. Networks 202 may also include any type of wired and/or wireless network, including but not limited to local area networks (LANs), wide area networks (WANs), Wi-Fi, WiMax, and mobile communications networks (e.g. 3G, 4G, and so forth). Networks 202 may utilize communications protocols, including packet-based and/or datagram-based protocols such as internet protocol (IP), transmission control protocol (TCP), user datagram protocol (UDP), or other types of protocols. Moreover, networks 202 may also include a number of devices that facilitate network communications and/or form a hardware basis for the networks, such as switches, routers, gateways, access points, firewalls, base stations, repeaters, backbone devices, and the like.

Environment 200 further includes one or more client device(s) 204 associated with web user(s). Client device(s) 204 may include any type of computing device that a web user may employ to send and receive information over networks 202. For example, client device(s) 204 may include, but are not limited to, desktop computers, laptop computers, tablet computers, wearable computers, media players, automotive computers, mobile computing devices, smart phones, personal data assistants (PDAs), game consoles, mobile gaming devices, set-top boxes, and the like. Client device(s) 204 generally include one or more applications that enable a user to send and receive information over the web and/or internet, including but not limited to web browsers, e-mail client applications, chat or instant messaging (IM) clients, and other applications. Such applications may include functionality for interacting with a search engine. For example, a browser or other application installed on a client device may enable the user to interact with a search engine through a user interface.

As shown, environment 200 may further include one or more web server device(s) 206. Briefly stated, web server device(s) 206 include computing devices that are configured to serve content or provide services to users over network(s) 202. Such content and services include, but are not limited to, hosted static and/or dynamic web pages, social network services, e-mail services, chat services, games, multimedia, and any other type of content, service or information provided over networks 202.

In some embodiments, web server device(s) 206 may collect and/or store information related to online user behavior as users interact with web content and/or services. For example, web server device(s) 206 may collect and store data for search queries specified by users using a search engine to search for content on networks 202. Moreover, web server device(s) 206 may also collect and store data related to web pages that the user has viewed or interacted with, the web pages identified using an IP address, uniform resource locator (URL), uniform resource identifier (URI), or other identifying information. This stored data may include web browsing history, cached web content, cookies, and the like.

In some embodiments, users may be given the option to opt out of having their online user behavior data collected, in accordance with a data privacy policy implemented on one or more of web server device(s) 206, or on some other device. Such opting out allows the user to specify that no online user behavior data is collected regarding the user, or that a subset of the behavior data is collected for the user. In some embodiments, a user preference to opt out may be stored on a web server device, or indicated through information saved on the user's web user client device (e.g. through a cookie or other means). Moreover, some embodiments may support an opt-in privacy model, in which online user behavior data for a user is not collected unless the user explicitly consents.

As further shown in FIG. 2, environment 200 may include one or more search server device(s) 208. Search server device(s) 208, as well as the other types of server devices shown in FIG. 2, are described in greater detail herein with regard to FIG. 3. Search server device(s) 208 may be configured (e.g., with a search engine) to receive and execute web search queries entered by users and provide search results. In some embodiments, search server device(s) 208 perform a process for query intent determination such as that described with regard to FIG. 6.

Figure 4:
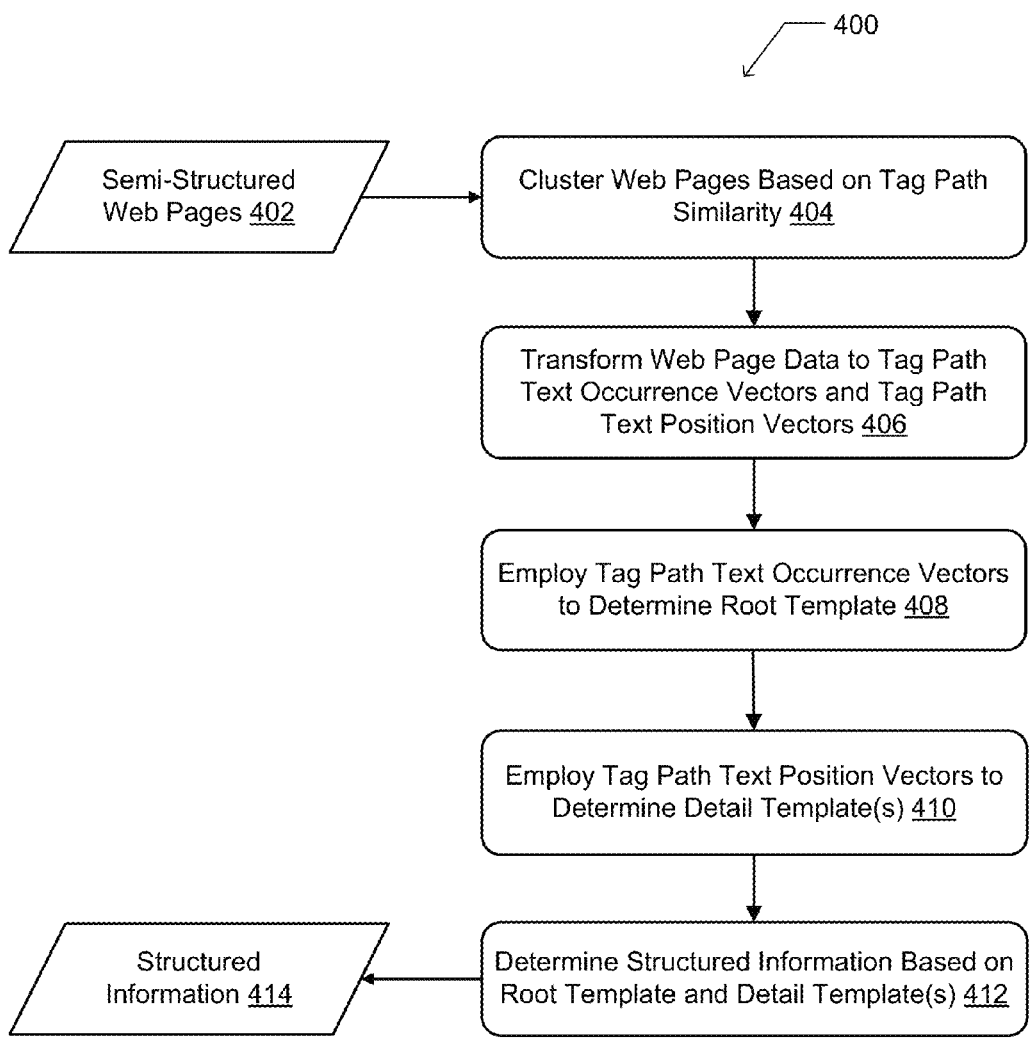
FIG. 4 depicts a flow diagram of an illustrative process for determining structured information based on semi-structured web pages, according to embodiments.

Environment 200 may also include one or more knowledge extraction server device(s) 210 that extract structured knowledge from semi-structured web pages, as described further with regard to FIG. 4. Such structured knowledge may be stored by knowledge extraction server device(s) 210 in a knowledge base or other data storage device. Such a knowledge base may be incorporated into (e.g., local to) the knowledge extraction server device(s) 210, or may be external such as in data storage device(s) 212. The structured information generated by knowledge extraction server device(s) 210 may then be provided to search server device(s) 208 to enable the structured information to be provided to users requesting searches. In some embodiments, knowledge extraction server devices 210 may also perform a web page clustering process such as that described with regard to FIG. 5. In other embodiments, the clustering process may be performed by one or more separate devices.

Environment 200 may further include one or more data storage devices 212, configured to store data related to the various operations described herein. Such storage devices may be incorporated into one or more of the servers depicted, or may be external storage devices separate from but in communication with one or more of the servers. In some embodiments, data storage device(s) 212 may include a knowledge base to store structured information extraction from semi-structured web pages by knowledge extraction server device(s) 210.

In some embodiments, one or more of the server devices depicted in FIG. 2 may include multiple computing devices arranged in a cluster, server farm, cloud computing service, or other distributed or non-distributed groupings of computing devices to share workload. Such groups of servers may be load balanced or otherwise managed to provide more efficient operations. Moreover, although various computing devices of environment 200 are described as clients or servers, each device may operate in either capacity to perform operations related to various embodiments. Thus, the description of a device as client or server is provided for illustrative purposes, and does not limit the scope of activities that may be performed by any particular device. Moreover, in some embodiments the functionality of devices depicted in FIG. 2 may be combined, e.g. such that the operations of knowledge extraction server device(s) 210 and search server device(s) 208 may occur on a single device or cluster of devices.

Example Computing Device Architecture

Figure 3:
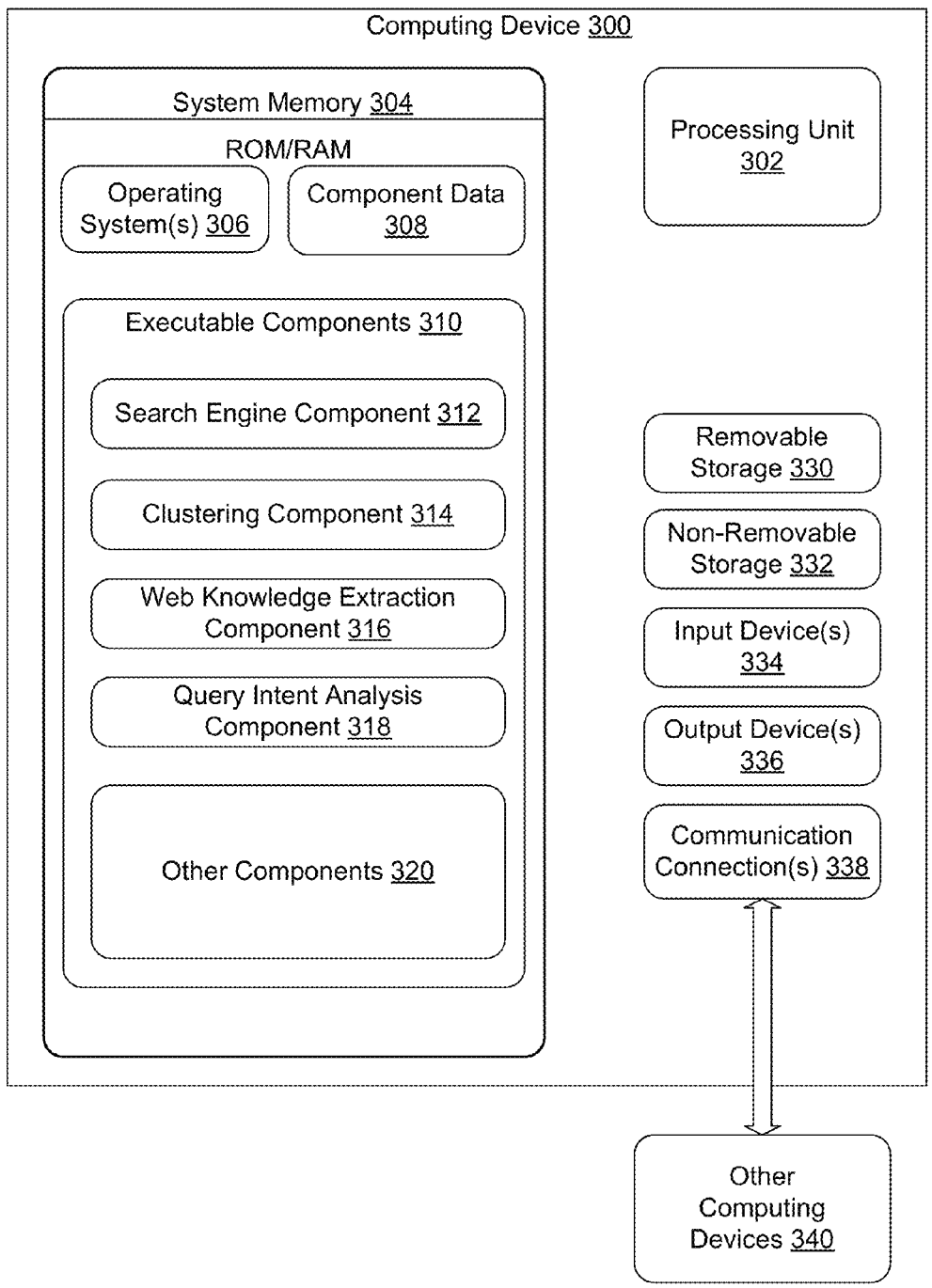
FIG. 3 is a diagram of an example computing device, which may be deployed as part of the example environment of FIG. 2 according to embodiments.

FIG. 3 depicts a block diagram for an example computing device architecture for various devices depicted in FIG. 2. As shown, computing device 300 includes processing unit 302. Processing unit 302 may encompass multiple processing units, and may be implemented as hardware, software, or some combination thereof. Processing unit 302 may include one or more processors. As used herein, processor refers to a hardware component. Processing unit 302 may include computer-executable, processor-executable, and/or machine-executable instructions written in any suitable programming language to perform various functions described herein. In some embodiments, processing unit 302 may further include one or more graphics processing units (GPUs).

Computing device 300 further includes a system memory 304, which may include volatile memory such as random access memory (RAM), static random access memory (SRAM), dynamic random access memory (DRAM), and the like. System memory 304 may further include non-volatile memory such as read only memory (ROM), flash memory, and the like. System memory 304 may also include cache memory. As shown, system memory 304 includes one or more operating systems 306, and one or more executable components 310, including components, programs, applications, and/or processes, that are loadable and executable by processing unit 302. System memory 304 may further store program/component data 308 that is generated and/or employed by executable components 310 and/or operating system(s) 306 during their execution.

Executable components 310 include one or more of various components to implement functionality described herein, on one or more of the servers depicted in FIG. 2. For example, executable components 310 may include a search engine 312 operable to receive search queries from users and perform web searches based on those queries. Search engine 312 may also provide a user interface that allows the user to input a query and view search results. Executable components 310 may also include a clustering component 314 that is configured to perform various tasks related to web page clustering, as described further herein.

In some embodiments, executable components 310 may include a web knowledge extraction component 316. This component may be present, for example, where computing device 300 represents knowledge extraction server device(s) 210. Web knowledge extraction component 316 may be configured to perform various tasks related to the extraction of structured information from semi-structured web pages, as described herein. Executable components 310 may also include a query intent analysis component 318, to perform tasks related to user query intent determination, as described below with reference to FIG. 6. Executable components 410 may further include other components 320.

As shown in FIG. 3, computing device 300 may also include removable storage 330 and/or non-removable storage 332, including but not limited to magnetic disk storage, optical disk storage, tape storage, and the like. Disk drives and associated computer-readable media may provide non-volatile storage of computer readable instructions, data structures, program modules, and other data for operation of computing device 300.

In general, computer-readable media includes computer storage media and communications media.

Computer storage media includes volatile and non-volatile, removable and non-removable media implemented in any method or technology for storage of information such as computer readable instructions, data structure, program modules, and other data. Computer storage media includes, but is not limited to, RAM, ROM, erasable programmable read-only memory (EEPROM), SRAM, DRAM, flash memory or other memory technology, compact disc read-only memory (CD-ROM), digital versatile disks (DVDs) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave or other transmission mechanism. As defined herein, computer storage media does not include communication media.

Computing device 300 may include input device(s) 334, including but not limited to a keyboard, a mouse, a pen, a voice input device, a touch input device, and the like. Computing device 300 may further include output device(s) 336 including but not limited to a display, a printer, audio speakers, and the like. Computing device 300 may further include communications connection(s) 338 that allow computing device 300 to communicate with other computing devices 340, including client devices, server devices, data storage devices, or other computing devices available over network(s) 202.

Example Processes

Figure 5:
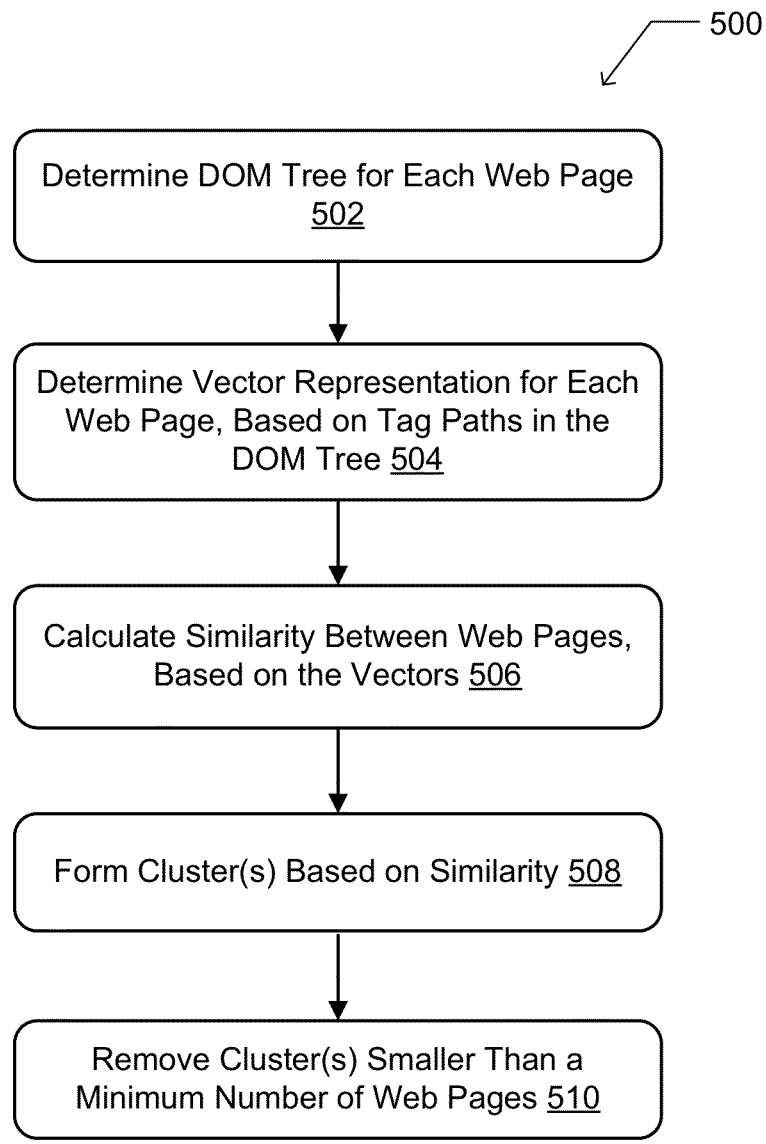
FIG. 5 depicts a flow diagram of an illustrative process for web page clustering, according to embodiments.
Figure 6:
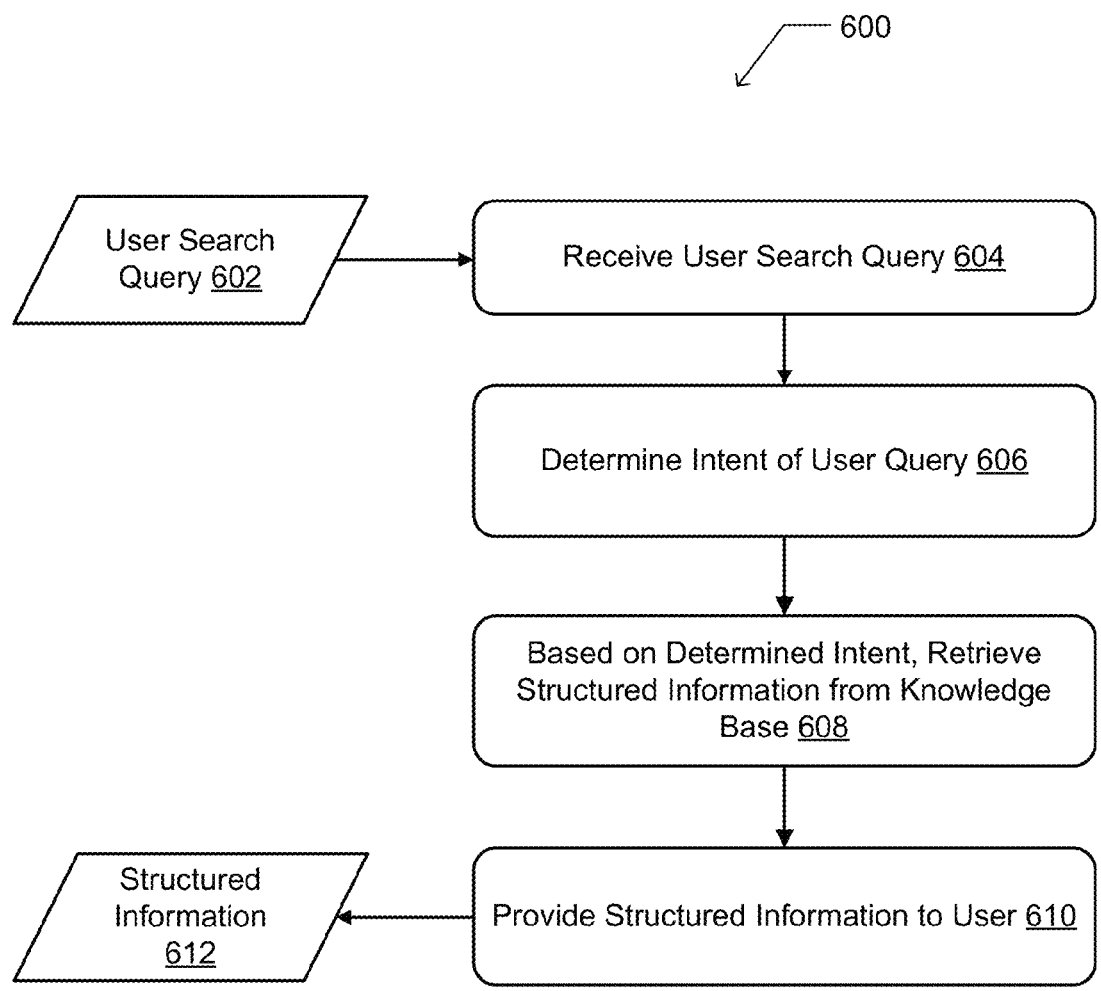
FIG. 6 depicts a flow diagram of an illustrative process for providing structured information based on a determined intent for a user query, according to embodiments.

FIGS. 4-6 depict flowcharts showing example processes in accordance with various embodiments. The operations of these processes are illustrated in individual blocks and summarized with reference to those blocks. The processes are illustrated as logical flow graphs, each operation of which may represent a set of operations that can be implemented in hardware, software, or a combination thereof. In the context of software, the operations represent computer-executable instructions stored on one or more computer-readable storage media. Execution of the computer-executable instructions by one or more processors enables the one or more processors to perform the recited operations. Generally, computer-executable instructions include routines, programs, objects, modules, components, data structures, and the like that perform particular functions or implement particular abstract data types. The order in which the operations are described in the flow diagrams is not intended to be construed as a limitation, and any number of the described operations can be divided into sub-operations, combined in any order, and/or executed in parallel to implement the processes.

FIG. 4 depicts an example process 400 for extracting structured information from one or more semi-structured web pages. In some embodiments, process 400 executes on one or more of the devices shown in FIG. 2, such as knowledge extraction server device(s) 210, and may be executed by one or more of the executable components 310, such as web knowledge extraction component 316. One or more semi-structured web pages 402 are clustered at 404 for form one or more groups of web pages based on similarities between the web pages. In some embodiments clustering may proceed using a K-means type clustering algorithm, as described below with regard to FIG. 5. However, other clustering algorithms may be employed to cluster the web pages. In some embodiments the semi-structured web pages 402 are a set of pages that compose a web site or more than one web site. The pages are semi-structured in that they include both data and metadata that provides at least some structure for the data.

Such metadata may be in the form of a markup language such as Hypertext Markup Language (HTML), Extensible Markup Language (XML), or the like.

At 406 the web page data for the one or more clusters is transformed to tag path text vectors and tag path position vectors. As used herein, a tag path is a path from a root node to a text node in the DOM tree of a web page. The tag path text is a combination of a tag path and the text node of the tag path. FIG. 7A depicts a DOM tree 702 of an example web page "Page 1," and FIG. 7B shows a list of tag path text items derived from the DOM tree 702. In FIG. 7B, the first column 704 is a list of tag paths, and the second column 706 is a list of text nodes corresponding to each tag path. For example, in line 01 of FIG. 7B, "<html><body><a>" is a tag path corresponding to text node "Archipelago 1.14," and the tag path text for this line is "<html><body><a> Archipelago 1.14." FIG. 7C shows a list of tag paths 708 and corresponding text nodes 710 for another example web page, "Page 2." In some embodiments, use of a DOM tree description, tag path text data, and/or other digest of web site data enables scalability and the processing of large amounts of web site data.

In some embodiments, a tag path text occurrence vector is a vector of the occurrences of tag path text items in a cluster of web pages. The tag path text occurrence vector $V_{tpt}$ for each tag path text may be expressed mathematically as shown in Equation (1):

$$V_{tpt} = [f_1, f_2, \ldots, f_n] \quad \text{Equation (1)}$$

where the length n of $V_{tpt}$ is the number of input web pages in the cluster, and $f_i$ is the occurrence frequency of the a tag path text in the $i_{th}$ page. For example, based on the example tag path text data items in FIGS. 7B and 7C, the tag path text occurrence vector for tag path text "<html><body><dl><dt> Price:" is (1, 1), given that this tag path text occurs once in Page 1 and once in Page 2. The tag path text occurrence vector for tag path text "<html><body><dl><dt><div> $2.99" is (1, 0), given this particular tag path text occurs once in Page 1, and zero times in Page 2. In some embodiments, a tag path text occurrence vector is calculated for each unique tag path text item in the cluster.

In some embodiments, a tag path text position vector is a vector of the positions where a tag path text occurs in each page. The tag path text position vector $P_{tpt}$ for each tag path text may be expressed mathematically as shown in Equation (2):

$$P_{tpt} = [p_1, p_2, \ldots, p_n] \quad \text{Equation (2)}$$

where the length n of $P_{tpt}$ is the number of input web pages in the cluster, and $p_i$ is a set of positions where the tag path text in the $i_{th}$ page. For example, based on the example web pages in FIGS. 7B and 7C, the tag path text position vector for "<html><body><a> Recommendations" is ({6}, {8}), given that this tag path text is at line 06 in Page 1, and line 08 in Page 2. In cases where a tag path text appears more than once in a page, each value of the tag path text position vector is an ntuple of the positions for each occurrence.

At 406 the one or more web pages are transformed to one or more tag path text occurrence vectors and one or more tag path text position vectors. In some embodiments, tag path text occurrence vectors and tag path text position vectors are calculated for each unique tag path text items in the pages of the cluster. At 408 the tag path text occurrence vectors are employed to determine a root template for the cluster of web pages. In some embodiments, determining the root template includes determining each tag path text item that: 1) appears in more than a certain root template threshold value (e.g., more than 90%) of the pages in the cluster; and 2) occurs once in the pages where it is found. The root template is the set of all tag path text items that satisfy these conditions. In some embodiments, the root template threshold value operates to reduce noise data in the process, and makes the process noise tolerant. In some embodiments, the threshold is adjusted to determine a particular tolerance level for noise in the web site data.

For example, based on the example tag path text data items of FIGS. 7B and 7C, the root template may include the tag path text items with "Price:," "Last updated," and "Recommendations," given the example threshold of 90%, because these three tag path text items satisfy both conditions for inclusion in the root template. The example root template so extracted is depicted in FIG. 7D. As shown, Root Template 712 includes the three identified tag path text items, each indicated as part of its own data section 714, 716, and 718 respectively. In some embodiments, determining a root template may be viewed as identifying aspects of the pages that are invariant across the cluster (e.g., that are present in more than the root template threshold of pages). Table 1 gives example pseudo-code for determining a root template.

TABLE 1

Input: a set of input web pages $D_n$, and a support threshold value s
Output: induced root template RT
Steps:
01:    convert $D_n$ to tag path representations $DP_n$
02:    analyze $DP_n$ to determine all distinct tag path texts TPT, occurrence vectors $V_{TPT}$ and position vectors $PS_{TPT}$
03:    Initialize RT to be empty
04:    for each tag path text tpt in TPT do
05:        get occurrence vector $V_{tpt}$ for tpt from $V_{TPT}$
06:        if support($V_{tpt}$) >= s*n then
07:            add tpt to RT
08:        end if
09:    end for
10:    identify "Data Section" between tag path texts
11:    return RT At 410 the tag path text position vectors are employed to determine one or more detail templates for the cluster. In some embodiments, this includes dividing the DOM trees of the cluster of web pages into blocks based on the tag path text items present in the root template. For example, as shown in FIG. 7E, Page 1 would be divided into blocks 720, 722, and 724 based on the three tag path text items in the root template 712.

After the cluster is divided into blocks, at 410 detail templates are determined by classifying the tag path text items in the cluster that were not determined to be part of the root template. In some embodiments, determination of detail templates includes induction of the detail templates based on each block (e.g., blocks 720, 722, and 724) of the tag path text item lists for each page. In each block, patterns are detected to identify additional data fields and generate detail templates.

In some embodiments, this pattern detection includes an identification of at least one of three types of data fields: 1) data fields in a single slot; 2) data fields displayed in a list pattern; and 3) other data fields. A data field of the first type may be identified after a tag path text item which occurs once in most pages, in which case the tag path text is marked as a "value." A data field of the first type may also be identified as occurring in certain portions of pages, in which case it is marked as an "optional value." In some embodiments if a data field is identified within one or more pages but does not occur in all the pages of the group or cluster, then it may be considered optional regardless of which portion(s) of the page(s) the data field is in. In some embodiments, a threshold value may be employed such that a data field that occurs in at least a certain percentage (e.g., 60%) of pages is marked as an optional value.

A data field of the second type may be identified as following an equivalence class that occurs one or more times, and for which no other tag path is present. This type of data field may be marked as a "list." In some embodiments, identification of the first two types of data fields enables the original data sections to be split, and the newly divided sections are similarly processed in a recursive manner.

Table 2 gives example pseudo-code for determining a detail template.

TABLE 2

Input: root template RT, a set of input pages $DP_n$, a threshold value s
Output: one or more detail templates ST
Steps:
01:    for all $DP_n$ determine all distinct tag paths TP, occurrence vectors $V_{TP}$, and position vectors $PS_{TP}$
02:    initialize ST = RT, initialize a template T to empty
03:    while T != ST
04:        T = ST
05:        for each Data Section in T do
06:            get $TP_d$, $V_{TPd}$, $PS_{TPd}$ from TP, $V_{TP}$, $PS_{TP}$
07:            initialize SubTemplate $T_S$ to be empty
08:            for each tp in $TP_d$ do
09:                get $V_{tp}$ from $V_{TPd}$, $PS_{tp}$ from $PS_{TPd}$
10:                Template Line tl = check(tp, $V_{tp}$, $PS_{tp}$, s)
11:                add tl to $T_s$
12:            end for
13:            sort $T_s$
14:            insert $T_s$ to ST
15:        end for
16:        go through $PS_{TP}$, add flag "Data Section" into ST
17:    end while
18:    return ST FIGS. 7F and 7G show example detail templates 726 and 728, respectively. As shown, detail template 726 corresponds to the tag path text item list for Page 1, shown in FIG. 7B. Detail template 728 corresponds to the tag path text item list for Page 2, shown in FIG. 7C. Details templates 726 and 728 include "#value#," "#optional value#," and "#list#" data fields, identified as described above.

Figure 7H:
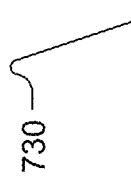

At 412, structured information 414 is determined for the cluster based on the root template and detail template(s) previously determined for each page of the cluster. In some embodiments, the structured information is extracted from the root and detail templates, based on the determined values, optional values, and/or lists, and summarized in a table format. Related information for each page in the cluster may be summarized in each row of the table, and the various pages collated by shared data type. An example structured information table 730 is depicted in FIG. 7H. As shown in this example, information extracted for two different products "Archipelago 1.14" and "Blockx 3D Pro 1.3" is summarized in table format, with information for "Price," "Last Updated," and "Recommendations." Thus, the number of rows in the structure information table corresponds to the number of web pages in the cluster, and the number of columns corresponds to the number of data fields in the templates.

In some embodiments, the generated structured information 414 is stored in a knowledge base or other data storage, and retrieved in response to user search queries. In some embodiments, process 400 may further include one or more post processing steps. In some embodiments, these steps include the manual application of one or more heuristic rules to filter out noise data in web sites.

FIG. 5 depicts an example process 500 for clustering of web pages. In some embodiments, process 500 executes on one or more of the devices shown in FIG. 2, such as knowledge extraction server device(s) 210, and may be executed by one or more of executable components 310, such as clustering component 314. In some embodiments, a plurality of web pages are formed into one or more clusters based on similarities within the pages. In the example depicted in FIG. 5, and described below, clustering is based on information within the bodies of the pages. In other embodiments, clustering may be performed based on similarities within the URLs or other identifiers for the pages. Moreover, in some embodiments information from both the page bodies and page identifiers may be used to determine page similarities for clustering.

In some embodiments, the set of web pages to be clustered are the various web pages that form a web site. However, clustering may also be performed on a set of web pages from multiple web sites. At 502 a DOM tree is determined for each web page of the set of web pages to be clustered. At 504 a vector representation is determined for each web page, based on the tag paths in the DOM trees of the web pages in the set. The tag path vector representation for each page may be described mathematically for each page p, as a vector $V_p = [w_1, w_2, \ldots, w_n]$, wherein n is the number of all distinct tag paths in the set of web pages, and $w_i$ is the weight of the $i_{th}$ tag path in page p.

In some embodiments, the weight of each tag path is calculated using term frequency index page frequency indexing, such that the more frequently a tag path appears in the set of pages, the higher the weight it is given. Mathematically, the inverse page frequency (ipf) and weight (w) may be expressed as shown in Equations (3) and (4) as follows:

$$ipf(tp_i) = \frac{|P|}{|\{p : tp_i \in p\}|} \qquad \text{Equation (3)}$$

and $$w_i = tf\_ipf(tp_i, p) = tf(tp_i, p) \times ipf(tp_i) \qquad \text{Equation (4)}$$

where P is a collection of all the pages in the set (e.g., in the input web site), $tp_i$ is the $i_{th}$ tag path, $|\{p : tp_i \in p\}|$ is the number of pages in which $tp_i$ appears, $ipf(tp_i)$ is the inverse page frequency of tag path $tp_i$, and $tf(tp_i, p)$ is the frequency of $tp_i$ in page p.

At 506 a similarity value or measure may be calculated between the web pages, based on the tag path vector for each web page. In some embodiments, the similarity measure is a cosine similarity measure. For example, the cosine similarity measure may be based on a Euclidean dot product of two tag path vectors A and B for two pages, as shown in Equation 5.

$$\text{similarity} = \cos() = \frac{A \cdot B}{\|A\| \|B\|} \qquad \text{Equation (5)}$$

In some embodiments other similarity measures may be used. For example, embodiments may employ Jaccard Coefficients, which measures a size of an intersection of two sets divided by the size of the union of the two sets, as shown in Equation 6.

$$J(A, B) = \frac{|A \cap B|}{|A \cup B|} \quad \text{Equation (6)}$$

At 508 one or more clusters are formed based on the measured similarity between the tag path vectors of the pages. In some embodiments, clustering may be performed by processing each page once, with the first page of a cluster identified as a centroid of the cluster. In such embodiments, the complexity of the clustering algorithm may be described in order notation as $O(m*n)$, where n is the number of pages and m is the number of clusters. Generally $m<n$.

At 510 the process removes clusters that are smaller than a minimum number of web pages. For example, process 500 may filter out those clusters that are below a certain size threshold (e.g., clusters that contain <0.1% of the pages of the set). Table 3 gives example pseudo-code for clustering process 500.

TABLE 3

Input: a set of n web pages $DP_n$, and a threshold value s
Output: one or more clusters C
Steps:
01:   for each page p in $DP_n$, determine all distinct tag paths and the number of pages in which each tag path appears.
02:   initialize C to be empty
03:   for each page p do
04:      get weight vector $V_p$;
05:      initialize flag f = false;
06:      for each cluster c in C do
07:         get weight vector $V_c$ of the first page in c
08:         if $\cos\_sim(V_p, V_c) >= s$ then
09:            add p to c;
10:            f = true;
11:            break;
12:         end if
13:      end for
14:      if f=false then
15:         initialize new cluster c = {p};
16:         add c to C;
17:      end if
18:   end for
19:   filter small clusters from C;
20:   return C;

FIG. 6 depicts an example process 600 for providing structured information to a user in response to a user query. In some embodiments, process 600 executes on one or more of the devices shown in FIG. 2, such as search server device(s) 208, and may be executed by one or more of executable components 310, such as search engine component 312. At 604 a user search query 602 is received. In some embodiments, user search query 602 is entered by a user through a search engine. In general, a search query is a logical expression that consists of one or more terms and zero or more logical operators.

At 606 a user query intent is determined. In some embodiments, the query intent is determined by applying one or more heuristic rules to the user search query 602. Such rules may include identifying one or more keywords within the query that can be associated with data fields of the structured information stored in the knowledge base. In some embodiments, this identification of keywords enables a classification of the submitted user query into one or more query types. Various types of query intent are supported by embodiments. Examples of determined query intent may include a comparison type query, in which the user is requesting a search to compare multiple products, services, persons, objects, ideas, and the like. Such a query may be in the form of "compare BrandX to BrandY." This determination may be based on the identification of one or more keywords within the query, such as "compare," "versus," "better," and the like.

Other examples of determined query intent may include:

A price inquiry query, in which the user is requesting a search to determine a price of a product or service available from one or more vendors, e.g. "price of XPhone 3."

A query for detail attributes for a product, service, or other entity on the web, e.g. "business hours for XYZ Pizza Delivery."

A query for reviews, critiques, or evaluations of a product or service by customers and/or experts, e.g. "review opera Don Giovanni."

A query for repair or maintenance services, e.g. "ABC car repair."

A query for a product manual, e.g. "XPhone 3 manual how to use."

Determination of query intent may be based on one or more identified keywords in the query. In some embodiments, possible keywords for query intent may be determined through data mining or other analysis of search query logs, to determine particular search terms that co-occur at a high frequency with certain commonly searched entities.

At 608 structured information is retrieved from a knowledge base or other database where it has been stored, based on the user query and determined user query intent. For example, the example structured information 730 depicted in FIG. 7H may be provided to a user who entered a query comparing products "Archipelago 1.14" and "Blockx 3D Pro." At 610 the structure information 612 is provided to the user, displayed in a user interface or through other means.

Conclusion

Although the techniques have been described in language specific to structural features and/or methodological acts, it is to be understood that the appended claims are not necessarily limited to the specific features or acts described. Rather, the specific features and acts are disclosed as example forms of implementing such techniques.

What is claimed is:

1. A computer-implemented method comprising:
under control of one or more processors configured with executable instructions:
forming a cluster for a plurality of web pages based at least in part on a similar characteristic of the plurality of web pages;
transforming data of the cluster to determine one or more occurrence vectors and one or more position vectors for data items of the plurality of web pages;
determining a root template for the cluster based on the one or more occurrence vectors;
determining one or more detail templates for the cluster based on the one or more position vectors, wherein determining the one or more detail templates comprises:
dividing document object model (DOM) trees of the plurality of web pages of the cluster into a plurality of blocks based at least in part on a plurality of tag path text items present in the root template;
detecting one or more patterns in each block of the plurality of blocks to identify additional data fields;
identifying an additional data field of the additional data fields to be one of a first type or a second type in a block of the plurality of blocks, the identifying enabling the block to be split into a plurality of new blocks, wherein the first type comprises a data field located after a tag path text item which occurs once in at least a predetermined number of web pages and the second type comprises a data field following an equivalence class that occurs one or more times and for which no other tag path is present; and repeating the detecting and the identifying for the plurality of new blocks; and extracting structured information for the cluster based on the root template and the one or more detail templates.

2. The method of claim 1, wherein the forming the cluster includes:

determining a document object model (DOM) tree for each of the plurality of web pages;

determining a vector representation for each of the plurality of web pages based on one or more tag paths in the DOM trees;

calculating a similarity value based on the vector representation; and forming the cluster based on the similarity value.

3. The method of claim 2, wherein the calculating the similarity value is based on a cosine similarity measure.

4. The method of claim 1, wherein the similar characteristic is located in a body of at least some of the plurality of web pages.

5. The method of claim 1, wherein the forming the cluster includes employing a K-means algorithm.

6. The method of claim 1, further comprising determining a list of tag path text items for each of the plurality of web pages, wherein the one or more occurrence vectors and the one or more position vectors are determined based at least in part on the determined lists of tag path text items.

7. The method of claim 1, wherein the structured information includes comparison information.

8. The method of claim 1, wherein the determining the one or more detail templates is recursive.

9. A system comprising:
one or more processors;
a memory; and
a web knowledge extraction component stored in the memory and executable by the one or more processors to:
extract one or more occurrence vectors and one or more position vectors for data included in a plurality of pages;
determine a root template based on the one or more occurrence vectors;
determine one or more detail templates based on the one or more position vectors, wherein determining the one or more detail templates comprises:
dividing document object model (DOM) trees of the plurality of pages of the cluster into a plurality of blocks based at least in part on a plurality of tag path text items present in the root template;
detecting one or more patterns in each block of the plurality of blocks to identify additional data fields;
identifying an additional data field of the additional data fields to be one of a first type or a second type in a block of the plurality of blocks, the identifying enabling the block to be split into a plurality of new blocks, wherein the first type comprises a data field located after a tag path text item which occurs once in at least a predetermined number of pages and the second type comprises a data field following an equivalence class that occurs one or more times and for which no other tag path is present; and
repeating the detecting and the identifying for the plurality of new blocks; and
provide structured information for the plurality of pages based on the root template and the one or more detail templates.

10. The system of claim 9, further comprising a clustering component stored in the memory and executable by the one or more processors to identify one or more clusters of pages from the plurality of pages.

11. The system of claim 10, wherein identifying the one or more clusters is based at least in part on similarity of at least one tag path text item of the plurality of pages.

12. The system of claim 10, wherein the clustering component further operates to determine whether each of the one or more clusters is larger than a minimum number of pages.

13. The system of claim 9, wherein the plurality of pages are semi-structured web pages.

14. One or more computer-readable storage media, storing instructions that enable a processor to perform actions comprising:

automatically transforming data of a plurality of semi-structured pages, to determine one or more occurrence vectors and one or more position vectors;

determining at least one root template based at least in part on the one or more occurrence vectors;

determining at least one detail template based at least in part on the one or more position vectors, wherein determining the at least one detail template comprises:
dividing document object model (DOM) trees of the plurality of semi-structured pages of the cluster into a plurality of blocks based at least in part on a plurality of tag path text items present in the root template;
detecting one or more patterns in each block of the plurality of blocks to identify additional data fields;
identifying an additional data field of the additional data fields to be one of a first type or a second type in a block of the plurality of blocks, the identifying enabling the block to be split into a plurality of new blocks, wherein the first type comprises a data field located after a tag path text item which occurs once in at least a predetermined number of semi-structured pages and the second type comprises a data field following an equivalence class that occurs one or more times and for which no other tag path is present; and
repeating the detecting and the identifying for the plurality of new blocks; and extracting structured information from the at least one root template and the at least one detail template.

15. The one or more computer-readable storage media of claim 14, wherein the actions further comprise storing the structured information in a knowledge base.

16. The one or more computer-readable storage media of claim 14, wherein the actions further comprise providing the structured information in response to a search query based at least in part on a determination of at least one intent indicated by the search query.

17. The one or more computer-readable storage media of claim 14, wherein the actions further comprise clustering the plurality of semi-structured pages based at least in part on at least one similarity of at least some of the plurality of semi-structured pages.

18. The one or more computer-readable storage media of claim 17, wherein the at least one similarity is in tag path text data of at least some of the plurality of semi-structured pages.

19. The one or more computer-readable storage media of claim 14, the actions further comprising:
receiving a query;
identifying one or more keywords in the query that are associated with data fields of structured information in the knowledge base, the identifying enabling a classification of the query into one or more query intents; and
retrieving the structured information from the knowledge base based at least in part on the query and the one or more query intents.

\* \* \* \* \*